(12) United States Patent
Takao et al.

(10) Patent No.: US 7,631,720 B2
(45) Date of Patent: Dec. 15, 2009

(54) SEATBELT RETRACTOR (75) Inventors: Masato Takao, Minato-ku (JP); Koji Tanaka, Minato-ku (JP); Daisuke Murakami, Minato-ku (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/076,752

(22) Filed: Mar. 21, 2008

(65) Prior Publication Data
US 2008/0238076 A1 Oct. 2, 2008

(30) Foreign Application Priority Data
Mar. 30, 2007 (JP) ............................. 2007-093231

(51) Int. Cl.
B60R 21/00 (2006.01)
(52) U.S. Cl. ..................................... 180/268
(58) Field of Classification Search ................ 180/268; 280/807, 806; 242/374, 390.8, 390.9
See application file for complete search history.

(56) References Cited

U.S. PATENT DOCUMENTS

| 6,374,938 | B2* | 4/2002 | Yano et al. | 180/268 |
| 6,554,092 | B2* | 4/2003 | Midorikawa et al. | 180/268 |
| 6,827,308 | B2* | 12/2004 | Fujii et al. | 242/390.9 |
| 7,308,348 | B2 | 12/2007 | Tanaka et al. | |
| 7,516,808 | B2* | 4/2009 | Tanaka | 180/268 |
| 2006/0222079 | A1 | 10/2006 | Park et al. | |
| 2006/0261589 | A1* | 11/2006 | Tanaka | 280/806 |
| 2006/0290131 | A1 | 12/2006 | Tanaka | |

FOREIGN PATENT DOCUMENTS

| EP | 1 818 225 A1 | 8/2007 |
| JP | 2005-280497 | 10/2005 |
| JP | 2006-76351 | 3/2006 |

* cited by examiner

*Primary Examiner*—Paul N Dickson
*Assistant Examiner*—Robert A Coker
(74) *Attorney, Agent, or Firm*—Foley & Lardner LLP (57) ABSTRACT

A seat belt retractor includes a seat belt winding device for winding up a seat belt by actuation of a motor and a control unit that repeats a process of stopping the actuation of the motor on an overload of the motor and restarting actuation of the motor after lapse of a predetermined time period. The control unit includes a detection module for detecting an occupant getting on or off a vehicle and a determination module that, using criteria, determines whether or not actuation of the motor is to be restarted. The criteria when the occupant enters the vehicle is different from when the occupant exits the vehicle. The criteria are provided so that the determination module is more likely to determine that the actuation of the motor is not to be restarted when the occupant enters the vehicle as compared to when the occupant exits the vehicle.

6 Claims, 7 Drawing Sheets

| DETERMINATION | OUTPUTTED FROM | INPUTTED SIGNAL |
|---|---|---|
| GETTING OFF | SEAT BELT WEARING SENSOR | WEARING SIGNAL → WEARING CANCELLATION SIGNAL |
| GETTING ON | DOOR SENSOR | DOOR CLOSED SIGNAL → DOOR OPEN SIGNAL |
| | SEAT BELT WEARING SENSOR | WEARING CANCELLATION SIGNAL |

SEATBELT RETRACTOR

BACKGROUND

The invention relates to a safety arrangement for motor vehicles, which safety arrangement, in a crash, in particular a crash from the side, is intended to avoid the situation where an additional load is placed on a vehicle occupant because of an interaction between a motor vehicle seat and the occupant situated on the seat. In addition, the present invention may relate to motor vehicle seats with rigid and/or pronounced side bolsters.

The present invention relates generally to the field of seat belt winding. Particularly, the present invention relates to a seat belt retractor for winding up a seat belt by means of a motor, a seat belt apparatus with the seat belt retractor, and a method of winding up a seat belt by a motor.

A vehicle, such as an automobile, typically includes a seat belt apparatus for restraining an occupant in a seat. The seat belt apparatus may include a seat belt or webbing, a buckle, a tongue plate, and a retractor.

The retractor is a device for winding up the seat belt and may include a winding mechanism using spring force and a pretensioner that moves a piston by explosion of a powder or other material to strongly pull the belt in the event of an emergency, such as a vehicle collision, to restrain the occupant in the seat. A motorized retractor may include a motor to wind up the seat belt.

To reduce the electric power consumption, the motorized retractor may be adapted so that electric power is supplied to the motor when winding up the seat belt and the supply of the electric power to the motor is stopped and the motor is turned off after winding-up the seat belt. However, when the seat belt is caught by something such as an arm of the occupant during the winding-up of the seat belt or when the occupant starts the withdrawal of the seat belt during wind-up of the seat belt, the motor may not be suitably controlled to stop.

SUMMARY

One embodiment of the invention relates to a seat belt retractor that includes a seat belt winding device for winding up a seat belt by actuation of a motor and a control unit that repeats a process of stopping the actuation of the motor when an overload of the motor is detected and restarting the actuation of the motor after a lapse of a predetermined time period. The control unit includes a detection module for detecting an occupant getting on or off a vehicle and a determination module that, using criteria, determines whether or not actuation of the motor is to be restarted. The criteria when the occupant gets on or enters the vehicle is different from the criteria when the occupant gets off or exits the vehicle. The criteria are provided so that the determination module is more likely to determine that the actuation of the motor is not to be restarted when the occupant gets on or enters the vehicle as compared to when the occupant gets off the vehicle.

Another embodiment of the invention relates to a seat belt winding method for repeating, under a predetermined condition, a process of stopping the actuation of a motor, which provides power for winding up a seat belt, when an overload of the motor is detected during the actuation of the motor and restarting the actuation of the motor after a lapse of a predetermined time period. The method includes the steps of detecting an action of an occupant for getting on or off the vehicle and determining, using criteria, whether or not it is to restart the actuation of the motor, which is stopped by detection of the overload. The criteria for when the occupant gets on the vehicle and for when the occupant gets off the vehicle are different from each other. The criteria are provided so that the determining step is more likely to determine that the actuation of the motor is not to be restart when the occupant gets on the vehicle as compared to when the occupant gets off the vehicle.

DETAILED DESCRIPTION

According to an exemplary embodiment a motorized retractor may be used, for example as is disclosed in JP-A-2005-280497 and which is herein incorporated by reference in its entirety. The motorized retractor is configured to operate in a standby state where the winding-up of the seat belt is stopped for a predetermined time period when an overload is detected during the winding-up of the seat belt and restarts the winding-up after a lapse of the predetermined time period. The motorized retractor may be able to suitably handle a case where the seat belt is caught and a case where the withdrawal of the seat belt is started by the occupant during the winding-up.

There is a possibility that the seat belt may be completely wound up by the retractor when the occupant exits or gets off the vehicle. If the action of winding up the seat belt when the occupant exits or gets off the vehicle is ended without completing the wind-up, the seat belt and/or tongue plate may be left on the seat. This may worsen the appearance of the vehicle and interrupt the occupant from getting on the vehicle.

The present invention may include a seat belt retractor with improved reliability of the seat belt wind-up performance and can reduce the frequency of unnecessary actuations of the motor. The invention may also comprise a seat belt apparatus that includes the seat belt retractor and a method of winding up a seat belt.

A seat belt retractor according to a first aspect of the present invention comprises a seat belt winding device for winding up a seat belt by actuation of a motor and a control unit that repeats, under a predetermined condition, a process of stopping the actuation of the motor when an overload of the motor is detected and restarting the actuation of the motor after a lapse of a predetermined time period. The control unit includes a detection module for detecting an action of an occupant for getting on or off a vehicle and a determination module that determines, using criteria, whether or actuation of the motor, which is stopped by detection of the overload, is to be restarted. The criteria when the occupant gets on or enters the vehicle and when the occupant gets off the vehicle are different from each other. The criteria are provided so that the determination module more likely determines that the actuation of the motor is not to be restarted when the occupant gets on or enters the vehicle as compared to when the occupant gets off or exits the vehicle.

When the occupant gets off the vehicle, the determination module determines that the actuation of the motor is not to be restarted when the number of times of starting the actuation of the motor reaches a first number of times. When the occupant gets on the vehicle, the determination module determines that the actuation of the motor is not to be restarted when the number of times of starting the actuation of the motor reaches a second number of times, which may be lower than the first number of times.

The control unit may also comprise a clock module for clocking the motor actuating time period from the start to the stop of the actuation of the motor. When the occupant gets off the vehicle, the determination module determines that the actuation of the motor is not to be restarted when the motor actuating time period is shorter than a predetermined time period a third number of times in a row. When the occupant gets on the vehicle, the determination module determines that the actuation of the motor is not to be restarted when the motor actuating time period is shorter than the predetermined time period a fourth number of times in a row. The fourth number of times may be smaller than the third number of times.

It is preferable that a signal indicating the state of the seat belt (e.g., whether an occupant is wearing or not-wearing the seat belt) and a signal indicating whether the door is opened or closed are inputted into the control unit. The detection module detects an action of the occupant for getting on or off the vehicle according to these signals.

A seat belt apparatus according to a second aspect of the present invention includes a seat belt, a tongue plate that is slidably attached to the seat belt, a buckle to which the tongue plate is inserted and latched, and a seat belt retractor according to the first aspect of the present invention.

A seat belt winding method according to a third aspect of the present invention is a method for repeating, under a predetermined condition, a process of stopping the actuation of a motor, which provides power for winding up a seat belt, when an overload of the motor is detected during the actuation of the motor and restarting the actuation of the motor after a lapse of a predetermined time period. The method includes the steps of detecting an action of an occupant for getting on/off the vehicle and determining, using criteria, whether or not the actuation of the motor, which is stopped by detection of the overload, is to be restarted. The criteria when the occupant gets on the vehicle and when the occupant gets off the vehicle are different from each other. The criteria are provided so that the determination module more likely determines that the actuation of the motor is not to be restarted when the occupant gets on the vehicle as compared to when the occupant gets off the vehicle.

In the seat belt winding method, the determining step may be adapted so that when the occupant gets off the vehicle it is determined that the actuation of the motor is not to be restarted when the number of times of starting the actuation of the motor reaches a first number of times. When the occupant gets on the vehicle it may be determined that the actuation of the motor is not to be restarted when the number of times of starting the actuation of the motor reaches a second number of times, which is lower than the first number of times.

The seat belt winding method preferably further comprises a step of clocking the motor actuating time period from the start to the stop of the actuation of the motor. In the determining step, when the occupant gets off the vehicle it is determined that the actuation of the motor is not to be restarted when the motor actuating time period is shorter than a predetermined time period a third number of times in a row. When the occupant gets on the vehicle, it is determined that the actuation of the motor is not to be restarted when the motor actuating time period is shorter than the predetermined time period a fourth number of times in a row. The fourth number of times may be smaller than the third number of times.

It is preferable that, in the detecting step, an action of the occupant for getting on/off the vehicle is detected based on a signal indicating whether an occupant is wearing or not wearing the seat belt and a signal indicating whether the door is opened or closed.

According to the present invention, the winding-up action of the seat belt may be conducted not only when the occupant gets off the vehicle but also when the occupant gets on the vehicle. It is more likely determined that the actuation of the motor is not to be restarted when the occupant gets on the vehicle as compared to when the occupant gets off the vehicle. Therefore, the frequency of unnecessary actuations of the motor can be reduced and the reliability of the seat belt winding-up performance may be improved.

Hereinafter, an embodiment of a seat belt retractor according to the present invention will be described with reference to attached drawings.

Figure 1:
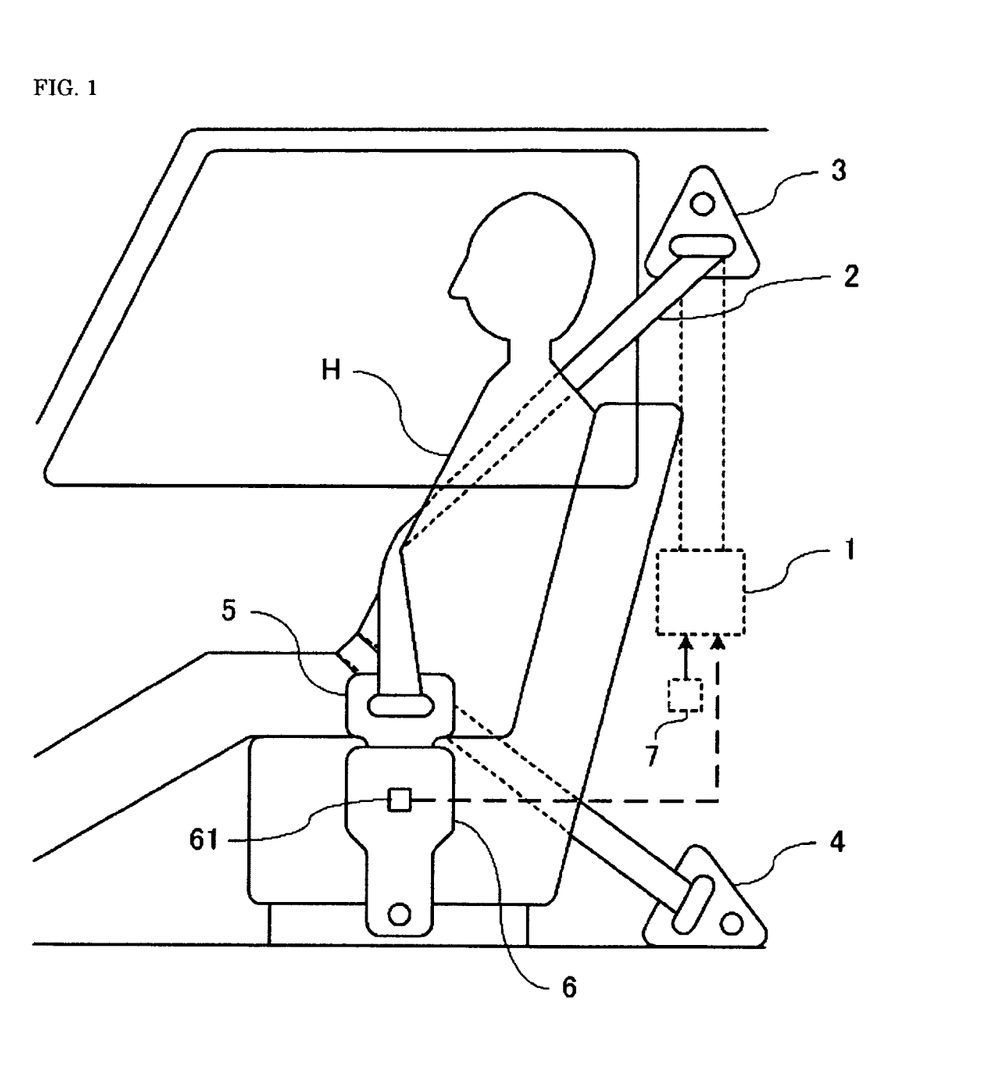
FIG. 1 is an illustration schematically showing an arrangement of a seat belt apparatus comprising a seat belt retractor according to an exemplary embodiment of the present invention.

FIG. 1 is an illustration schematically showing an arrangement of a seat belt apparatus comprising a seat belt retractor according to an embodiment of the present invention. The seat belt apparatus is attached to a vehicle seat and comprises, as shown in this drawing, a seat belt retractor 1, a seat belt 2, a deflection fitting 3, a belt anchor 4, a tongue plate 5, a buckle 6, and a door sensor 7.

The seat belt retractor 1 is configured to wind up the seat belt 2 by power of a motor and is fixed to an interior part of a side wall of a vehicle body. One end of the seat belt 2 is attached to the seat belt retractor 1 and the other end of the seat belt 2 passes through the deflection fitting 3 that is disposed around an upper portion of a center pillar and is attached to a belt anchor 4 fixed in the vicinity of the seat belt retractor 1.

The tongue plate 5 is supported by the seat belt 2 so that the tongue plate 5 is slidable in a predetermined range from a turn at the deflection fitting 3 to the belt anchor 4. The buckle 6 is fixed to the seat (or a floor of the vehicle body) and has a structure to which the tongue plate 5 is inserted and latched. The buckle 6 comprises a seat belt wearing sensor 61 which detects the latching of the tongue plate 5 so as to detect the wearing or cancellation of the wearing of the seat belt 2. The seat belt wearing sensor 61 outputs a detected signal to the seat belt retractor 1 via a wire.

When getting on the vehicle, an occupant H withdraws the seat belt 2 from the seat belt retractor 1 and inserts the tongue plate 5 into the buckle 6 to latch the buckle 6 with the tongue plate 5. Accordingly, the seat belt 2 may be worn by the occupant H so that the upper part and lap part of the occupant H are restrained relative to the seat.

The door sensor 7 is a sensor configured to detect whether a vehicle door is opened or closed and output a detected signal (i.e., door open signal, door closed signal) to the seat belt retractor 1 via a wire. The door sensor 7 may be composed of a pair of sensor contacts that are disposed on the vehicle door side and on the vehicle body side, respectively.

Figure 2:
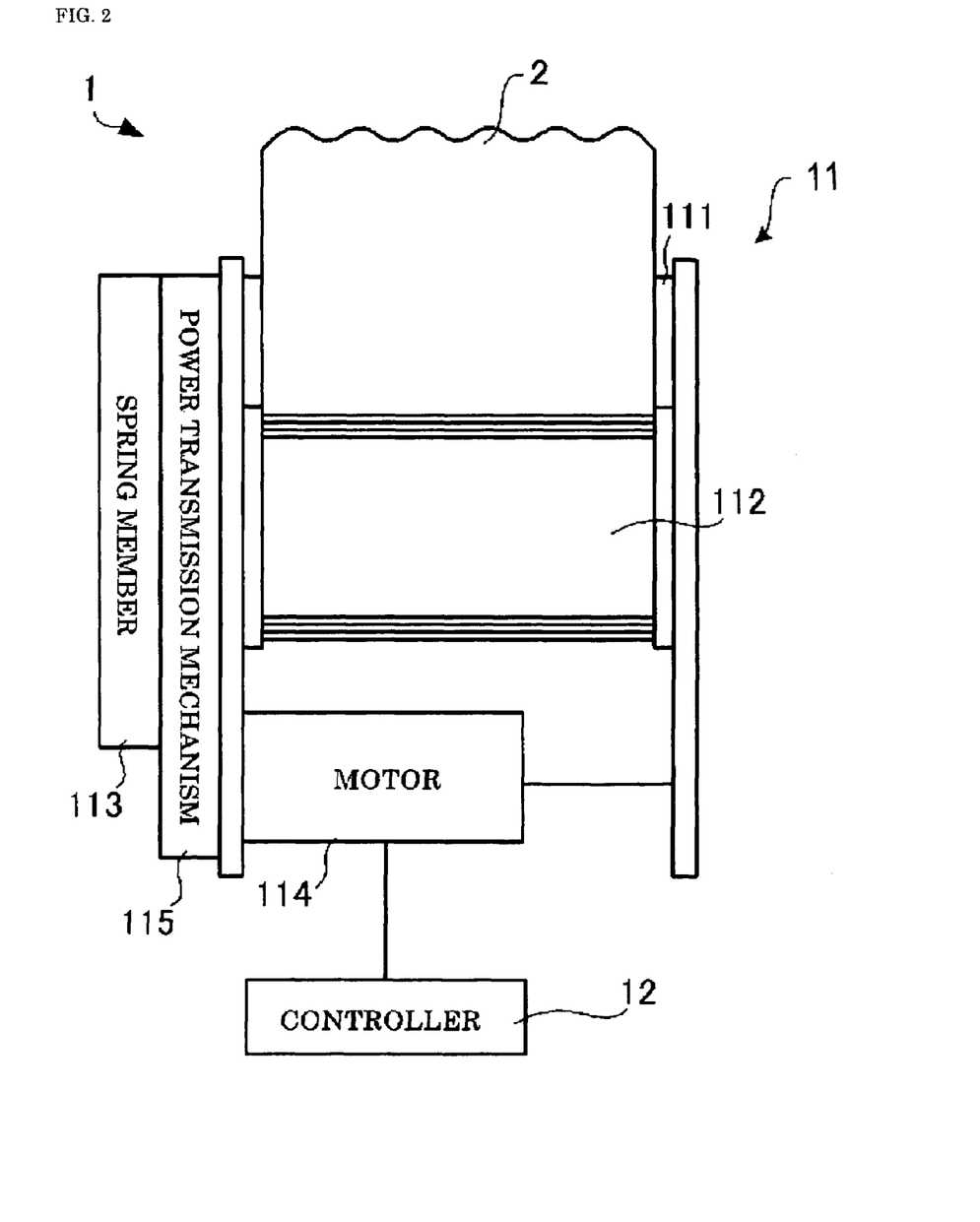
FIG. 2 is an illustration schematically showing an arrangement of the seat belt retractor according to an exemplary embodiment of the present invention.

FIG. 2 is an illustration schematically showing the structure of the seat belt retractor 1. The seat belt retractor 1 comprises a winding unit 11 (that includes a frame 111), a spool 112, a spring member 113, a motor 114, a power transmission mechanism 115, and a control unit 12.

The spool 112 is rotatably supported by the U-shaped frame 111. Attached to the outer surface of the spool 112 is an end of the seat belt 2. The spool 112 is rotated by the driving force of the motor 114 so the seat belt 2 is wound up by the seat belt retractor 1.

The spring member 113 generally biases the spool 112 in the winding direction by means of a spring force. The spring member 113 is supported by the frame 111 and is connected to the spool 112 via the power transmission mechanism 115.

The motor 114 is an electric motor for rotating the spool 112 and is supported by the frame 111. The power transmission mechanism 115 is arranged between the motor 114 and the spool 112 to transmit the power of the motor 114 to the spool 112 with varying the speed (e.g., reducing the speed). The power transmission mechanism 115 comprises a spool-side pulley fixed to the rotary shaft of the spool 112, a motor-side pulley fixed to the rotary shaft of the motor 114, and a timing belt positioned to extend between the pulleys with some tension (not all pulleys are shown). The power transmission mechanism 115 also has a clutch function to cancel the connection between the motor 114 and the spool 112 when the motor 114 is not actuated to allow the withdrawal of the seat belt 2 from the spool 112.

Figure 3:
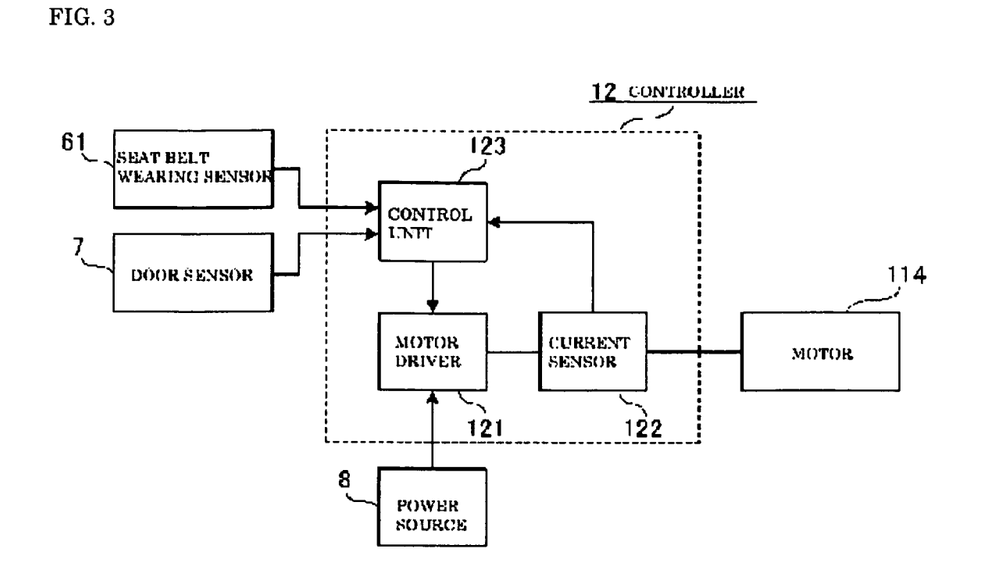
FIG. 3 is a block diagram showing an arrangement of a control unit and a connection thereof according to an exemplary embodiment.

Referring to FIG. 3, the control unit 12 controls the actuation of the motor 114 and comprises a motor driver 121, a current sensor 122, and a control unit 123. The control unit 12 is connected to the motor 114, a power source 8 for supplying the power for the motor 114, the seat belt wearing sensor 61, and the door sensor 7 via wires.

The motor driver 121 is connected to the power source 8 so that power supply voltage from the power source 8 is applied to the motor driver 121. The power source 8 may be a battery equipped on the vehicle. The motor driver 121 applies voltage to the motor 114 to actuate the motor 114 according to the control by the control unit 123.

The current sensor 122 is disposed between the motor driver 121 and the motor 114 to detect a value of current flowing through the motor 114. The current sensor 122 outputs a detected current value to the control unit 123.

The control unit 123 comprises a CPU (Central Processing Unit) that carries out a control program, a ROM (Read Only Memory) that stores the control program, a control parameter table or the like, and a RAM (Random Access Memory) that is used as a work area when the control program is carried out.

The control unit 123 controls the motor driver 121 according to control parameters for controlling the motor (i.e., from the control parameter table), thereby controlling the motor 114 via the motor driver 121. Specifically, the control unit 123 controls the rotation of the motor 114 in the form of PWM (Pulse Width Modulation). The control unit 123 generates a PWM signal of a predetermined duty ratio and outputs the generated PWM signal and a control signal indicating the rotational direction of the motor 114 to the motor driver 121. The motor driver 121 applies driving voltage to the motor 114 that is obtained by adjusting the power supply voltage according to the PWM signal. Accordingly, the motor 114 rotates at a speed according to the predetermined duty ratio so that the seat belt 2 is wound up onto the spool 112.

Hereinafter the process of winding up the seat belt 2 (seat belt winding-up process) to be carried out by the seat belt retractor 1 when the occupant H gets on or off the vehicle is described in greater detail.

Figure 4:
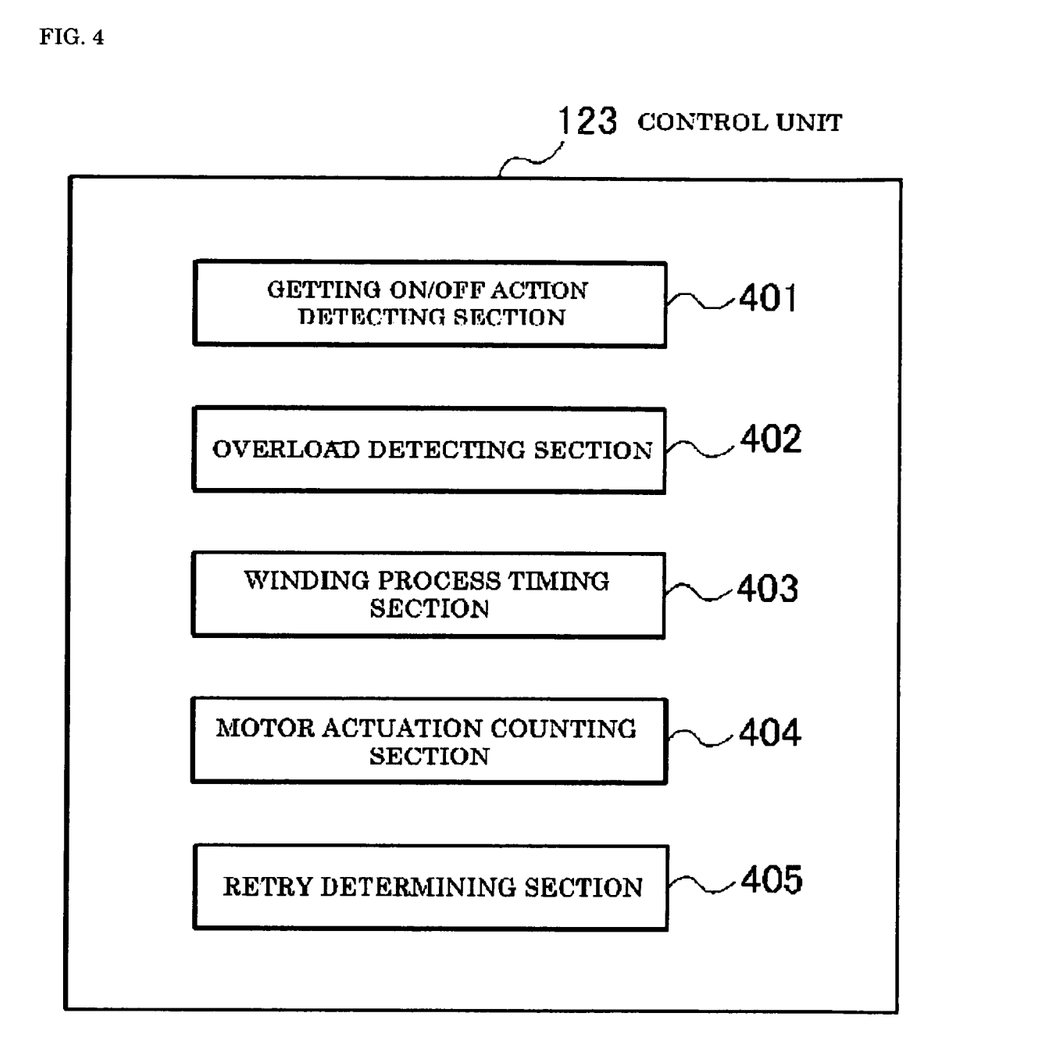
FIG. 4 is a block diagram showing an arrangement of a function for handling a seat belt winding-up process of a control unit shown in FIG. 3 according to an exemplary embodiment.

Referring to FIG. 4, as a function for handling the seat belt winding-up process, the control unit 123 comprises an action detection module 401, an overload detection module 402, a winding process timing section 403, a motor actuation counting section 404, and a retry determining section 405.

The action detection module 401 detects an action of the occupant H for getting on or off the vehicle based on a wearing signal/wearing cancellation signal from the seat belt wearing sensor 61 and a door open signal/door closed signal from the door sensor 7 when the seat belt winding-up process is not conducted. When the action is detected by the detection module 401, the control unit 123 starts the seat belt winding-up process as will be described later. The method taken by the action detection module 401 for detecting the action for getting on or off the vehicle will be described with reference to FIG. 5.

Figure 5:
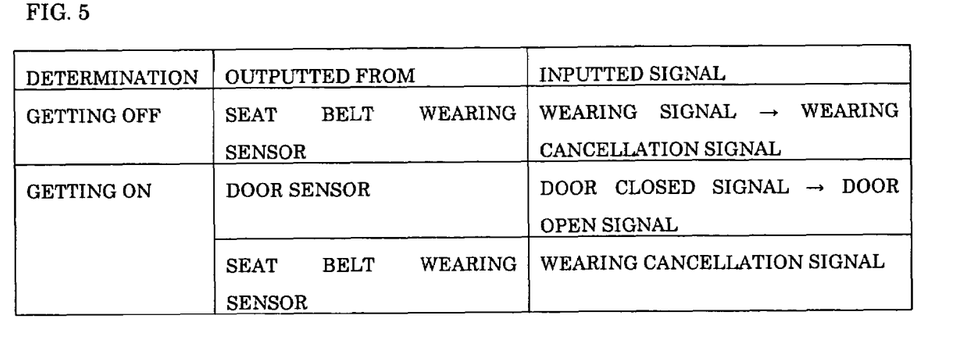
FIG. 5 is a table for explaining the method of detecting a getting-on or off action by a detection module of the control unit shown in FIG. 3 according to an exemplary embodiment.

As shown in a table of FIG. 5, when the inputted signal from the seat belt wearing sensor 61 is switched from a wearing signal to a wearing cancellation signal, the action detection module 401 determines that the occupant H takes an action for getting off the vehicle (in other words, determines that the occupant H is about to get off the vehicle). When the inputted signal from the door sensor 7 is switched from a door closed signal to a door open signal and a wearing cancellation signal is inputted from the seat belt wearing sensor 61 (that is, the seat belt 2 is not worn), the action detection module 401 determines that the occupant H takes an action for getting on the vehicle (in other words, determines that the occupant H is about to get on the vehicle).

Referring again to FIG. 4, the overload detection module 402 detects an overload applied to the motor 114 caused by the completion of winding-up; the catching of the seat belt by the body of the occupant H, the seat, or the door; or the start of withdrawal of the seat belt 2 by the occupant H. When the overload is detected, the control unit 123 commands the motor driver 121 (i.e., outputs a stopping signal) to stop the actuation (i.e. the rotation) of the motor 114. The overload detection module 402 compares a current value (i.e., a motor current value) detected by the current sensor 122 with a predetermined current value (i.e., a current threshold for detecting overload) and determines that the overload is detected when the motor current value is equal to or more than the current threshold for detecting overload (e.g., 5 Amperes).

The winding process timing section 403 clocks the operating time period (e.g., the execution time period) of the seat belt winding process by the seat belt retractor 1. The winding process timing section 403 may be a software timer. Specifically, the winding process timing section 403 starts the clocking when the action detection module 401 detects an action of the occupant H for getting on/off the vehicle, for example at the point of starting the seat belt winding-up process. The timing section 403 continues the clocking until the seat belt winding-up process is terminated. The clocking may continue even when the motor 114 is stopped. Exemplary applications of the result of the clocking by the winding process timing section 403 (e.g., winding process time period) are described below.

The motor actuation counting section 404 may be a counter for counting the number of times of starting the actuation of the motor 114 (e.g., a motor actuation number).

After an overload is detected by the overload detection module 402 and the actuation of the motor 114 is stopped, the retry determining section 405 determines whether or not the motor 114 is to be actuated again, for example whether or not the seat belt 2 is to be wound-up again (e.g., to retry wind-up, to retry wind-up judgment, etc.). The retry determining section 405 makes such a determination using different criteria in a case that the occupant H is about to get on and in a case that the occupant H is about to get off, respectively. The criteria are provided so that the retry determining section 405 more likely determines that it is not required to retry when the occupant gets on the vehicle as compared to when the occupant gets off the vehicle. This is because it is highly probable that the seat belt 2 is in the state that the winding-up is completed or nearly completed when the occupant gets on the vehicle because of the winding-up when the occupant gets off the vehicle last time. The criteria is set as mentioned above for reducing the unnecessary actuation of the motor 114 when the occupant gets on the vehicle.

Specifically, the retry determining section 405 mat determine that the retry is not required when the number of times of starting the actuation of the motor 114 reaches a predetermined number of times that are previously determined and correspond to when the occupant gets on and off the vehicle. For example, the predetermined number of times when the occupant gets off the vehicle (the first number of times) may be set to four and the predetermined number of times when the occupant gets on the vehicle (the second number of times) may be set to two.

Figure 6:
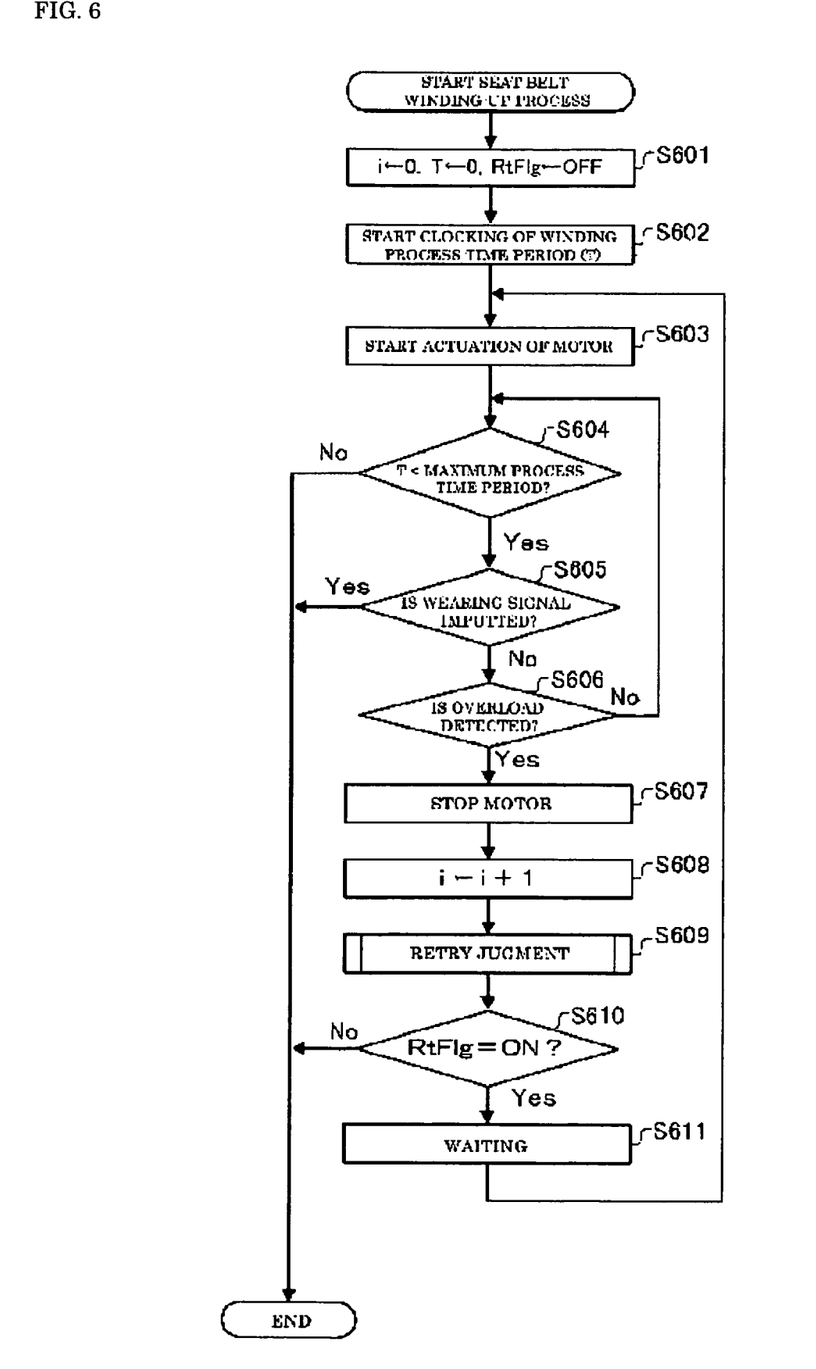
FIG. 6 is a flow chart showing procedures of the seat belt winding-up process according to an exemplary embodiment of the present invention.

FIG. 6 is a flow chart showing procedures of the seat belt winding-up process according to an exemplary embodiment. The seat belt winding-up process is started by an action of the occupant H for getting on or off the vehicle detected by the action detection module 401.

The control unit 123 of the control unit 12 sets various parameters (e.g., i, T, RtFlg, etc.) to be in initial states (Step S601). "i" is a parameter in which the result of the counting (motor actuation number) by the motor actuation counting section 404 is stored.

"T" is a parameter in which the result of the clocking (winding process time period) by the winding process timing section 403 is stored.

"RtFlg" is a flag in which the result of the retry judgment by the retry determining section 405 is stored. If the RtFlg is ON, the flag indicates that it is required to retry (e.g., to actuate the motor 114 to wind up the seat belt 2 again). If the RtFlg is OFF, the flag indicates that it is not required to retry (e.g., it is required to terminate the seat belt winding-up process).

The winding process timing section 403 starts the clocking of the winding-up process (Step S602). Meanwhile, the control unit 123 outputs the actuation signal to the motor driver 121. Accordingly, the motor 114 is started to rotate so that the seat belt 2 is wound up onto the spool 112 (Step S603).

It is determined whether or not the winding process time period (T) is shorter than the maximum process time period (Step S604). The maximum process time period may be a time period far exceeding the normal operation time period for the seat belt winding-up process by the normal seat belt retractor 1 and the winding process time period in the normal operation may never reach the maximum process time period. Therefore, when the winding-up process time period (T) reaches the maximum process time period (No in step S604), it can be determined that it is impossible to continue the winding-up due to some defect such as failure so that the process is terminated. The maximum process time period may be derived from tests, measurements, and theory and is previously stored in the control parameter table in memory such as a ROM. In one exemplary embodiment, the maximum process time period is set to 10 seconds.

When the winding-up process time period (T) does not reach the maximum process time period (Yes in step S604), the control unit 123 checks whether or not the wearing signal from the seat belt wearing sensor 61 is inputted into the control unit 12 (Step S605). When the wearing signal is inputted (Yes in step S605), the occupant H is wearing the seat belt 2 again and that the process is terminated.

When the wearing signal is not inputted (No in step S605), the condition of detection of an overload is checked (Step S606). When the overload is detected (Yes in step S606), the control unit 123 stops the actuation of the motor 114 via the motor driver 121 (Step S607). Therefore, the winding-up of the seat belt 2 is stopped. On the other hand, when the overload is not detected (No in step S606), the processes from step S604 are repeated.

As the actuation of the motor 114 is stopped because of the detection of the overload, the motor actuation counting section 404 counts up the motor actuation number (i) (Step S608). The retry judgment is carried out by the retry determining section 405 (Step S609).

Figure 7:
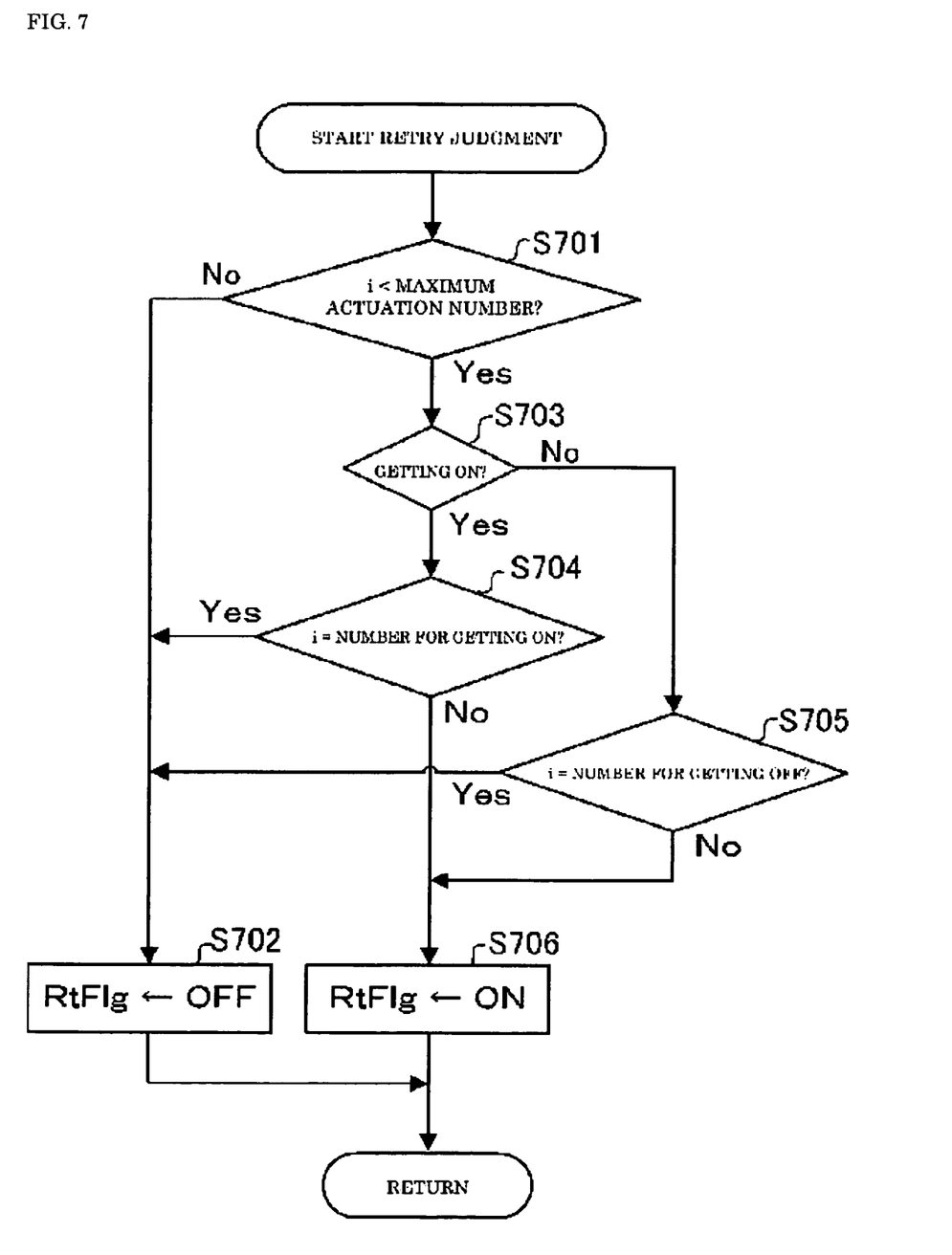
FIG. 7 is a flow chart showing procedures of the retry determination according to an exemplary embodiment of the present invention.

FIG. 7 is a flow chart showing procedures of the retry judgment according to an exemplary embodiment.

The retry determining section 405 determines whether or not the motor actuation number (i) is lower than the maximum actuation number (Step S701). The maximum actuation number is an upper limit of the motor actuation number and may be set to five in one exemplary embodiment. The maximum actuation number is also stored in the control parameter table similarly to the maximum process time as mentioned above. When the motor actuation number (i) reaches the maximum actuation number (No in step S701), the retry determining section 405 determines that it is impossible to wind up the seat belt 2 due to the completion of winding-up of the seat belt 2 or some other reason so that the retry is not required. As a result, the retry determining section 405 sets the RtFlg to be OFF (Step S702) and terminates this process (the retry judgment).

On the other hand, when the motor actuation number (i) is lower than the maximum actuation number (Yes in step S701), the retry determining section 405 checks whether the result of detection by the getting-on/off action detection module 401 is an action for getting on the vehicle or an action for getting off the vehicle. When the result is an action for getting on the vehicle (Yes in step S703), the process of step S704 is conducted. When the result is an action for getting off the vehicle (No in step S703) the process of step S705 is conducted.

In step S704, it is checked whether the motor actuation number (i) reaches the reference number of times when the occupant gets on the vehicle (the number for getting on) stored in the control parameter table. As a result of this, when the motor actuation number (i) does not reaches the number for getting on (for example, two) (No in step S704), the retry determining section 405 determines that the retry is required and sets the RtFlg to be ON (Step S706), and then terminates this process. On the other hand, when the motor actuation number (i) reaches the number for getting on (Yes in step S704), the retry determining section 405 determines that the winding-up of the seat belt 2 is completed so that the retry is not required (step S702).

In step S705, it is checked whether the motor actuation number (i) reaches the reference number of times when the occupant gets off the vehicle (the number for getting off) stored in the control parameter table. As a result, when the motor actuation number (i) does not reaches the number for getting off (for example, four) (No in step S705), the retry determining section 405 determines that the retry is required (Step S706). On the other hand, when the motor actuation number (i) reaches the number for getting off (Yes in step S705), the retry determining section 405 determines that the winding-up of the seat belt 2 is completed so that the retry is not required (step S702).

Returning to the flow chart of FIG. 6, when it is determined that the retry is not required as a result of the aforementioned retry judgment (No in step S610), the control unit 123 terminates the process (the seat belt winding-up process). On the other hand, when it is determined that the retry is required (Yes in step S610), the control unit 123 waits the process until a preset waiting time (for example, two seconds) stored in the control parameter table elapses (Step S611) and repeats the process from step S603.

As mentioned above, the seat belt retractor of this embodiment conducts the winding-up of the seat belt 2 (carries out the seat belt winding-up process) not only when the occupant gets off the vehicle but also when the occupant gets on the vehicle. Therefore, even when the seat belt winding-up process when the occupant gets off the vehicle last time is not completed, it is highly likely that the seat belt 2 becomes to a state that the winding-up is completed or nearly completed before the occupant H sits down. In the seat belt winding-up process when the occupant gets on the vehicle, the number of times of retrying the winding-up is set to be smaller than that when the occupant gets off the vehicle, thereby reducing the frequency of unnecessary actuations of the motor 114.

It should be understood that the present invention is not limited to the embodiment and various changes could be made without departing from the scope of the invention.

For example, the retry determining section 405 may determine that further winding-up action is not required (the retry is not required) when the motor actuating time period is shorter than a predetermined time period (for example, 0.5 second) a predetermined number of times in a row according to the getting-on/off action of the occupant. In this case, a reference number of times when the occupant gets on (the fourth number of times) and a reference number of times when the occupant gets off (the third number of times) are respective criteria when the occupant gets on and when the occupant gets off so that the fourth number of times is smaller than the third number of times (for example, the third number of times is two and the fourth number of times is one).

The motor actuating time period is a time period from the start of actuation of the motor 114 (a point when the control unit 123 outputs an actuation signal (PWM signal, a control signal indicating the rotational direction of the motor 114) to the motor driver 121) to the stop of the actuation of the motor 114 (a point when the control unit 123 outputs a stopping signal to the motor driver 121) and is clocked by a software timer.

In general, as the motor is actuated in the state where the winding-up is impossible, such as when the winding-up of the seat belt is completed or when it is impossible to release the catching of the seat belt, an overload is applied to the motor immediately after (i.e. shortly after) the actuation. Therefore, when the motor actuating time period is short, it is highly probable that the seat belt is in the state where winding-up is impossible. Therefore, the aforementioned arrangement further improves the efficiency of the winding-up action.

Further, the action of the occupant H for getting off the vehicle to be detected by the action detection module 401 is not limited to the action of the occupant H releasing the tongue plate 5 from the buckle 6, i.e. cancelling the wearing of the seat belt 2. For example, the action detection module 401 may determine that the occupant takes the action for getting off the vehicle when the occupant H cancels the wearing of the seat belt 2 and opens the door (a door open signal is outputted from the door sensor 7).

To increase the likelihood that the seat belt 2 is wound-up, the seat belt winding process may be started by the cancellation of wearing of the seat belt 2 and the door open as triggers. In this case, there may be the following two conditions:

(1) a case where the wearing of the seat belt 2 is cancelled and the door is opened
(2) a case where the door is open and the wearing of the seat belt 2 is cancelled In the first case, first a wearing cancellation signal from the seat belt wearing sensor 61 is inputted to the control unit 123 so that the seat belt winding process is conducted and the winding-up of the seat belt 2 is continued until the predetermined termination condition is satisfied as described in the embodiment. As a door open signal from the door open sensor 7 is inputted to the control unit 123, the seat belt winding-up process is conducted again. It should be noted that when a door open signal is inputted to the control unit 123 during the seat belt winding-up process according to the cancellation of wearing of the seat belt 2, the seat belt winding-up process according to the door open is started immediately after the end of the seat belt winding-up process according to the cancellation of wearing of the seat belt 2.

In the second case, first a wearing cancellation signal from the seat belt wearing sensor 61 is inputted to the control unit 123 so that the seat belt winding-up process according to the cancellation of wearing of the seat belt 2 is conducted and then the seat belt winding-up process based on the door open is started soon.

The method of detecting an overload of the motor 114 by the overload detection module 402 is not limited to the method based on current value (motor current value) detected by the current sensor 122 and may be any of various well-known detecting methods. For example, the control unit 12 and a sensor for measuring the tension of the seat belt 2 are connected by a wire and the overload detection module 402 may detect an overload of the motor 114 based on the magnitude of the tension applied on the seat belt 2.

Though the aforementioned exemplary embodiment has been described with reference to an example where the seat belt apparatus is mounted to the motor vehicle seat and the present invention may be applied to an airplane in which a seat belt apparatus is mounted to a seat, not limited to the motor vehicle.

The order of the respective processes in the flow charts described in the aforementioned exemplary embodiment is not limited to the order as described and the order may be changed without departing from the scope of the invention.

The function of the control unit 123 can be achieved by hardware, by software, or any combination thereof.

The Japanese Priority Application JP 2007-093231, filed Mar. 30, 2007 including the specification, drawings, claims and abstract, is incorporated herein by reference in its entirety.

Given the disclosure of the invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor comprising:
   a seat belt winding device for winding up a seat belt by actuation of a motor; and a control unit that under a predetermined condition repeats a process of stopping the actuation of the motor when an overload of the motor is detected and restarting the actuation of the motor after a lapse of a predetermined time period, the control unit comprises:
- a detection module for detecting an action of an occupant entering or exiting a vehicle; and
- a determination module that, using criteria, determines whether or not actuation of the motor, when stopped by detection of an overload, is to be restarted;

wherein the criteria when the occupant enters the vehicle is different from the criteria when the occupant exits the vehicle;

wherein the criteria are provided so that the determination module is more likely to determine that the actuation of the motor is not to be restarted when the occupant enters the vehicle as compared to when the occupant exits the vehicle, wherein the retractor is configured so that when the occupant exits the vehicle, the determination module determines that the actuation of the motor is not to be restarted when a number of times of starting the actuation of the motor reaches a first number of times, and when the occupant enters the vehicle, the determination module determines that the actuation of the motor is not to be restarted when a number of times of starting the actuation of the motor reaches a second number of times that is lower than the first number of times.

2. A seat belt retractor as claimed in any claim 1, wherein a first signal indicating a wearing or non-wearing of the seat belt and a second signal indicating a door open or close are inputted into the control unit, and the detection module detects an action of the occupant entering or exiting the vehicle according to the first and second signals.

3. A seat belt apparatus comprising:
- a tongue plate that is slidably attached to the seat belt;
- a buckle to which the tongue plate is inserted and latched; and
- a seat belt retractor comprising:
  - a seat belt winding device for winding up a seat belt by actuation of a motor; and
  - a control unit that under a predetermined condition repeats a process of stopping the actuation of the motor when an overload of the motor is detected and restarting the actuation of the motor after a lapse of a predetermined time period, the control unit comprises:
    - a detection module for detecting an action of an occupant entering or exiting a vehicle; and
    - a determination module that, using criteria, determines whether or not actuation of the motor, when stopped by detection of an overload, is to be restarted;
  - wherein the criteria when the occupant enters the vehicle is different from the criteria when the occupant exits the vehicle;
  - wherein the criteria are provided so that the determination module is more likely to determine that the actuation of the motor is not to be restarted when the occupant enters the vehicle as compared to when the occupant exits the vehicle,
  - wherein the control unit further comprises a clock module for clocking a motor actuating time period from a start to a stop of the actuation of the motor, wherein, when the occupant exits the vehicle, the determination module determines that the actuation of the motor is not to be restarted when the motor actuating time period is shorter than a predetermined time period a third number of times in a row, and when the occupant enters the vehicle, the determination module determines that the actuation of the motor is not to be restarted when the motor actuating time period is shorter than the predetermined time period a fourth number of times in a row, the fourth number of times being smaller than the third number of times.

4. A seat belt winding method for repeating, under a predetermined condition, a process of stopping the actuation of a motor, which provides power for winding up a seat belt, when an overload of the motor is detected during the actuation of the motor and restarting the actuation of the motor after a lapse of a predetermined time period, comprising the steps of:
- detecting an action of an occupant for entering or exiting the vehicle; and
- determining, using criteria, whether or not to restart the actuation of the motor, which is stopped by detection of the overload;

wherein, the criteria for when the occupant enters the vehicle and for when the occupant exits the vehicle are different from each other;

wherein, the criteria are provided so that the determining step is more likely to determine that the actuation of the motor is not to be restart when the occupant enters the vehicle as compared to when the occupant exits the vehicle, wherein in the determining step, when the occupant exits the vehicle, it is determined that the actuation of the motor is not to be restart when a number of times of starting the actuation of the motor reaches a first number of times, and when the occupant enters the vehicle, it is determined that the actuation of the motor is not to be restart when the number of times of starting the actuation of the motor reaches a second number of times that is lower than the first number of times.

5. A seat belt winding method as claimed in claim 4, further comprising a step of clocking the motor actuating time period from a start to a stop of the actuation of the motor,
- wherein, in the retry determining step, when the occupant exits the vehicle, it is determined that the actuation of the motor is not to be restart when the motor actuating time period is shorter than a predetermined time period a third number of times in a row, and
- when the occupant enters the vehicle, it is determined that the actuation of the motor is not to be restart when the motor actuating time period is shorter than the predetermined time period a fourth number of times in a row;
- the fourth number of times being smaller than the third number of times.

6. A seat belt winding method as claimed in claim 4, wherein in the detecting step, an action of the occupant for entering or exiting the vehicle is detected based on a signal indicating a wearing or non-wearing of the seat belt and a signal indicating a door open or close.

* * * * *